Figure 1:
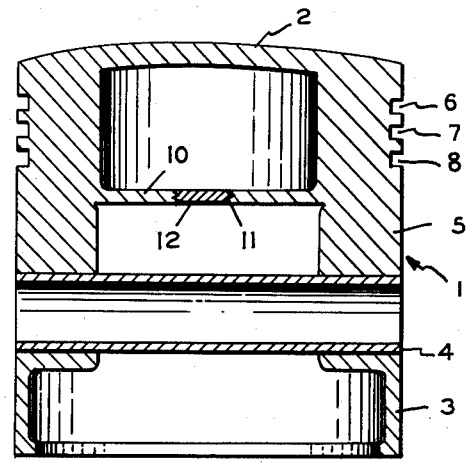

Nov. 27, 1962

H. A. RUDKIN, JR 3,066,002

PISTON DESIGN

Filed July 20, 1960

INVENTOR.
HENRY A. RUDKIN JR.
BY
ATTORNEYS

United States Patent Office 3,066,002
Patented Nov. 27, 1962

3,066,002
PISTON DESIGN
Henry A. Rudkin, Jr., Fairfield, Conn.
Filed July 20, 1960, Ser. No. 44,111
6 Claims. (Cl. 309—9)

This invention relates to a piston design for an internal combustion engine and more particularly to a piston adapted to be used in an engine having high operating combustion chamber temperatures such as a two-cycle engine or any high performance engine.

A problem confronting engine designers is that of rapid dissipation of heat from a piston head of an internal combustion engine to the side walls of the cylinder in which the piston reciprocates. It is known, particularly in high performance engines which operate at comparatively high combustion chamber temperatures, that a limiting factor in the design of an engine can be the operating temperature of the piston head or crown. This limitation becomes critical where lightweight pistons constructed of an aluminum alloy are utilized.

It is known that heat is dissipated from the piston head through the piston rings to the cylinder walls, through the bearing surfaces of the piston to the cylinder walls, and to the oil and the air below the piston. It has been estimated that 85% of the heat accumulated in the head of the piston or crown of the piston is given off to the cylinder walls through the top piston ring. It is thus apparent that the critical area in the piston from the heat flow aspect is near the top ring where most of the heat is dissipated to the cylinder side wall.

Heat has been dissipated in this critical area around the top ring heretofore by thickening the skirt in the area around the top ring groove so that a larger and easier heat flow path is provided to increase the heat flow from the piston crown to the piston skirt and thence to the cylinder wall in order to supplement the heat flow to the cylinder wall through the top ring. In addition, special alloys such as aluminum alloys have been used which have high heat conductivity to likewise provide for an easier heat flow path from the piston crown to the top ring, piston skirt and underside of the piston crown.

Even by thickening the portion adjacent the top ring and by using high heat conductivity material, difficulties have arisen where the pistons used were of an all aluminum construction. This has been particularly true in two-cycle engines and any high performance engines. Thus, it is known that when aluminum pistons are used, there must be a large clearance allowed between the piston and cylinder wall in order to compensate for the high rate of expansion of the piston. This, however, causes an audible knock when the engine is cold since the thrust of the connecting rod acting on the piston is reversed at the end of a stroke to cause the skirt to slap against the cylinder side wall. Also aluminum castings, unless very carefully annealed, are liable to grow when subjected to high temperatures and become distorted so that even more clearance must be provided than merely to compensate for the high rate of heat expansion.

It is an object of my invention to overcome the difficulties which have existed with the previous use of all aluminum pistons in two-cycle and high performance engines. Broadly, I overcome the aforementioned difficulties by providing for a hollow cylindrical member to be affixed to the underside of the head of the piston to provide for a greater area from which heat from the piston head may be dissipated and to be subjected to the cooling action of the air and oil below the piston and which at the same time will not appreciably increase the mass of the piston.

Further, the cylindrical member when hermetically sealed has particular adaptability to pistons for use in two-cycle engines having crankcase compression since the cup-like portion will increase the crankcase compression ratio of the engine.

Figure 2:
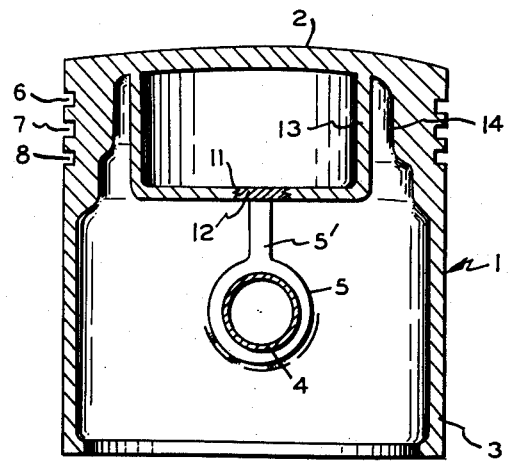

Referring to the drawings in which a preferred embodiment of my invention is shown, FIG. 1 is a sectional view of a piston constructed according to my invention; and FIG. 2 is a sectional view of the piston of FIG. 1 taken at right angles thereto.

Referring in greater detail to the drawings, 1 denotes generally a piston having a head or crown portion 2 and a skirt portion 3. The piston is provided with a wrist pin 4 which is carried in pin bosses 5 and to which a connecting rod (not shown) may be journalled. The piston skirt has on its upper portion thereof conventional ring grooves 6, 7, and 8.

A hollow cylindrical member or portion 10 is preferably cast into the piston at the time the piston itself is cast. For this purpose, an opening 11 is left in the cylindrical portion which, after the piston has been cast, is plugged off by means of a plug 12 in order that the interior of the cylindrical portion is hermetically sealed. The cup-like portion is cast so that its side walls 13 are separated from the inner periphery 14 of the skirt 3 by a small distance except where the sides of the cylindrical portion engage the pin boss stiffening strut 5' as shown in FIG. 1.

The upper side wall of the skirt 3 in the area surrounding the top ring groove is thickened in order to provide a large path for and to facilitate flow of heat from the crown 2 down to the skirt 3 which in turn prevents undue heating of the area of the skirt surrounding the top ring groove. Preferably the piston is made a single casting in order to further facilitate the flow of heat from the crown portion to the skirt and particularly to the cylindrical portion 10 since it is well known that interfaces between adjacent parts tend to disrupt heat flow through the parts.

It is obvious that by plugging the hole 11 with the plug 12 so as to hermetically seal the cylindrical portion, the effective volume of the piston is increased which in turn will increase the crankcase compression ratio when the piston is used in a two-cycle engine having crankcase compression. Because the interior of the cylindrical portion is hollow, the mass of the piston will not be appreciably increased. In the event that the hole 11 is on the order of ⅛ inch or less, it is not necessary that it be plugged in order for the cylindrical portion to effectively increase the crankcase compression ratio. This is because when the engine is operating at high r.p.m.'s, the amount of air passing through the hole would be negligible. Any air that would pass through the hole would exert a cooling blast against the underside of the piston crown.

It is important that the side walls of the cylindrical portion be separated from the inner side walls of the skirt except where the cylindrical portion joins the pin boss stiffening strut 5' in order to effectively increase the heat dissipation area of the underside of the piston crown 2. By so separating the side walls, the effective heat dissipation area of the underside of the piston head is increased approximately four times that of a conventional piston. This construction then draws away and dissipates a portion of the heat flowing from the piston crown to the area surrounding the top groove when compared with a conventional piston operated at the same combustion chamber temperature. The result is than when a piston constructed according to my invention is used, the engines may be operated at higher combustion chamber temperatures than when conventional pistons are used since the critical area surrounding the top groove may take an additional flow of heat from the heat absorbed by the piston crown equal to that dissipated by the addition of the cylindrical portion.

In addition to the above advantages, the cylindrical portion acts as a stiffener for the piston crown as its outer walls join with the pin boss strut 5' as shown in FIG. 1.

It has been found that aluminum alloy pistons constructed according to my invention, when an engine in which they were placed was taken down and inspected, have not shown evidence of pitting or heat scoring that appears in pistons of conventional design when operated at the same combustion chamber temperatures.

While I have described and illustrated a preferred embodiment of my invention, structural changes can be made and still come within the scope of my invention which is limited only by the appended claims.

I claim:

1. A piston for an internal combustion engine comprising a circular head portion, a cylindrical skirt portion having one end integral with the circumferential edge of said head portion, and a hollow cylindrical member having an outside diameter less than the inside diameter of said skirt portion disposed within and substantially spaced from said skirt portion and having one end attached to said head portion at a point spaced from said circumferential edge.

2. A piston according to claim 1 wherein said head portion, said skirt portion, and said hollow cylindrical portion comprise a single casting.

3. A piston according to claim 1 wherein said skirt portion has a greater thickness at its upper end adjacent said head portion than at its lower open end.

4. A piston according to claim 1 wherein the interior of said hollow cylindrical member is hermetically sealed.

5. A piston for an internal combustion engine comprising a circular head portion, a cylindrical skirt portion having one end integral with the circumferential edge of said head portion, a hollow cylindrical member having an outside diameter less than the inside diameter of said skirt portion disposed within said skirt portion and having one end attached to said head portion at a point spaced from said circumferential edge and having its other end closed, and stiffening struts connected at one end to the outer surface of said hollow cylindrical member and inner surface of said skirt portion on the diametrically opposite sides thereof and adapted to be connected at their other ends to a wrist pin boss.

6. A piston according to claim 5 wherein the interior of said cylindrical member is hermetically sealed.

References Cited in the file of this patent

UNITED STATES PATENTS

| | | |
|---|---|---|
| 2,214,891 | Schrom | Sept. 17, 1940 |
| 2,840,427 | Dolza | June 24, 1958 |
| 2,909,160 | Dickson | Oct. 20, 1959 |

FOREIGN PATENTS

| | | |
|---|---|---|
| 288,136 | Great Britain | Sept. 13, 1928 |
| 722,762 | Great Britain | Jan. 26, 1955 |